United States Patent
Shi et al.

(10) Patent No.: US 9,817,792 B2
(45) Date of Patent: Nov. 14, 2017

(54) SYSTEMS AND METHODS FOR CREATING A SURFACE IN A FAULTED SPACE

(71) Applicant: Landmark Graphics Corporation, Houston, TX (US)

(72) Inventors: Genbao Shi, Sugar Land, TX (US); Zitao Xu, Katy, TX (US); Jeffrey Yarus, Houston, TX (US); Richard L Chambers, Bixby, OK (US); Randy Guetter, Detroit Lakes, MN (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 0 days.

(21) Appl. No.: 15/233,639

(22) Filed: Aug. 10, 2016

(65) Prior Publication Data

US 2016/0350263 A1 Dec. 1, 2016

Related U.S. Application Data

(63) Continuation of application No. 13/816,450, filed as application No. PCT/US2010/044850 on Aug. 9, 2010, now Pat. No. 9,436,658.

(51) Int. Cl.
| | |
|---|---|
| *G06F 7/60* | (2006.01) |
| *G06F 17/10* | (2006.01) |
| *G06G 7/48* | (2006.01) |
| *G06F 17/17* | (2006.01) |
| *G01V 1/30* | (2006.01) |
| *G01V 99/00* | (2009.01) |
| *G06T 17/05* | (2011.01) |
| *G06T 17/20* | (2006.01) |

(52) U.S. Cl.
CPC .............. *G06F 17/17* (2013.01); *G01V 1/302* (2013.01); *G01V 99/005* (2013.01); *G06T 17/05* (2013.01); *G06T 17/20* (2013.01); *G01V 2210/641* (2013.01); *G01V 2210/642* (2013.01); *G01V 2210/665* (2013.01)

(58) Field of Classification Search
CPC .............. G06F 17/5018; G06F 17/5036; G06F 17/5009; G06F 2217/16; G05B 17/02
USPC ........................................ 703/2, 10
See application file for complete search history.

(56) References Cited

U.S. PATENT DOCUMENTS

| | | | |
|---|---|---|---|
| 6,138,076 A | 10/2000 | Graf et al. | |
| 9,436,658 B2* | 9/2016 | Shi | G01V 1/302 |
| 2003/0018436 A1 | 1/2003 | Stark | |
| 2003/0023383 A1* | 1/2003 | Stark | G01V 1/28 |
| | | | 702/14 |
| 2003/0231548 A1 | 12/2003 | Gillard et al. | |
| 2004/0260476 A1 | 12/2004 | Borgos et al. | |
| 2008/0288172 A1 | 11/2008 | Stone | |
| 2009/0093965 A1 | 4/2009 | Godfrey et al. | |

(Continued)

OTHER PUBLICATIONS

International Patent Application No. PCT/US2010/044850, International Search Report and Written Opinion, dated Oct. 4, 2010.

(Continued)

*Primary Examiner* — Saif Alhija
(74) *Attorney, Agent, or Firm* — Kilpatrick Townsend & Stockton LLP

(57) ABSTRACT

Systems and methods for creating a surface in a faulted space, which includes using interpolation techniques.

20 Claims, 5 Drawing Sheets

(56) References Cited

U.S. PATENT DOCUMENTS

2009/0248374 A1* 10/2009 Huang .................. E21B 43/00
 703/2
2009/0265152 A1 10/2009 Cacas et al.

OTHER PUBLICATIONS

International Patent Application No. PCT/US2010/044850, International Preliminary Report on Patentability, dated Aug. 31, 2012.
Canadian Patent Application No. 2,805,036, Office Action, dated Mar. 14, 2017, 4 pages.
Canadian Patent Application No. 2,805,036, Office Action, dated May 5, 2016, 4 pages.
Chinese Patent Application No. 201080068369.6, First Office Action, dated Mar. 26, 2015, 10 pages.
Australian Patent Application No. 2010359075, Examination Report, dated Oct. 23, 2013, 3 pages.
Eurasian Patent Application No. 201390084/(31), Office Action, dated May 25, 2015, 5 pages.
Eurasian Patent Application No. 201390084/(31), Office Action, dated Apr. 28, 2016, 5 pages.
Mexican Patent Application No. MX/A/2013/000646, Office Action, dated Jun. 18, 2014, 2 pages.
European Patent Application No. 10 855 973.3, Extended European Search Report, dated Sep. 11, 2017.

\* cited by examiner

SYSTEMS AND METHODS FOR CREATING A SURFACE IN A FAULTED SPACE

CROSS-REFERENCE TO RELATED APPLICATIONS

This application is a continuation of U.S. patent application Ser. No. 13/816,450 which is incorporated herein by reference, and claims the priority of PCT Patent Application Serial No. PCT/US10/44850, filed on Aug. 9, 2010, which is incorporated herein by reference.

STATEMENT REGARDING FEDERALLY SPONSORED RESEARCH

Not applicable.

FIELD OF THE INVENTION

The present invention generally relates to systems and methods for creating a surface in a faulted space. More particularly, the present invention relates to creating a surface by interpolation in a faulted space.

BACKGROUND OF THE INVENTION

Interpolation techniques are often used in the oil and gas industry to create a surface, sometimes referred to as a horizon, which may be used to locate hydrocarbons in a subsurface formation. Creating a surface from well tops, which are points on a well representing a surface level on a horizon at that point, in a faulted space is always challenging. It is also possible to use secondary information, such as, but not limited to, seismic data, to aid in the creation of the interpolated surface. Ideally, the interpolation should be done in the unfaulted space and then translated back into the faulted domain. This technique, which is commonly referred to as global unfaulting, effectively restores the faulted space to the unfaulted space on a global basis before faulting occurred. However, global unfaulting is very difficult, especially in the presence of many faults.

Refinement gridding is an interpolation technique that translates a coarse approximation of known data into a finer approximation by increasing the number of interpolated nodes on a step-by-step basis. Refinement gridding interpolation therefore, provides an approach to creating a surface in the faulted space directly. It generates very smooth surfaces when there is no fault, and the performance is very good, but it often creates significant undesirable artifacts 102 along the fault and at its edges as illustrated by the interpolated surface 100 in FIG. 1.

Traditional kriging, which is synonymous with optimal prediction, is another interpolation technique, which predicts unknown values from data observed in known locations. Kriging uses variograms to express the spatial variation, and minimizes the error of predicted values, which are estimated by spatial distribution of the predicted values. Traditional Kriging in the presence of a fault can generate cleaner edges along the fault when search neighborhoods are restricted to one side of the fault 202 or the other side of the fault 204 as illustrated by the interpolated surface 200 in FIG. 2. Traditional kriging, however, does not always eliminate artifacts 302 near fault terminations as illustrated by the interpolated surface 300 in FIG. 3.

There is therefore, a need for creating surfaces in a faulted space that reduces the incidental production of artifacts along faults and near fault terminations.

SUMMARY OF THE INVENTION

The present invention meets the above needs and overcomes one or more deficiencies in the prior art by providing systems and methods for creating a surface in a faulted space using interpolation techniques.

In one embodiment, the present invention includes a method for creating a surface having one or more faults, comprising: i) locating each local well top within a predefined search neighborhood from a grid node within a grid on the surface; ii) identifying each fault that crosses a vector between the grid node and each respective local well top, each vector between the grid node and each respective local well top representing an intersecting vector; iii) accumulating an adjusted fault throw value for each fault along each respective intersecting vector, which represents an accumulated fault throw value for each respective intersecting vector; iv) adjusting a value for each local well top based on a respective accumulated fault throw value; v) performing interpolation at the grid node using the adjusted value for each local well top and a computer processor; and vi) repeating steps a)-e) for each grid node within the grid.

In another embodiment, the present invention includes a non-transitory program carrier device tangibly carrying computer executable instructions for creating a surface having one or more faults, the instructions being executable to implement: i) locating each local well top within a predefined search neighborhood from a grid node within a grid on the surface; ii) identifying each fault that crosses a vector between the grid node and each respective local well top, each vector between the grid node and each respective local well top representing an intersecting vector; iii) accumulating an adjusted fault throw value for each fault along each respective intersecting vector, which represents an accumulated fault throw value for each respective intersecting vector; iv) adjusting a value for each local well top based on a corresponding accumulated fault throw value; v) performing interpolation at the grid node using the adjusted value for each local well top; and vi) repeating steps a)-e) for each grid node within the grid.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

Method Description

Figure 4:
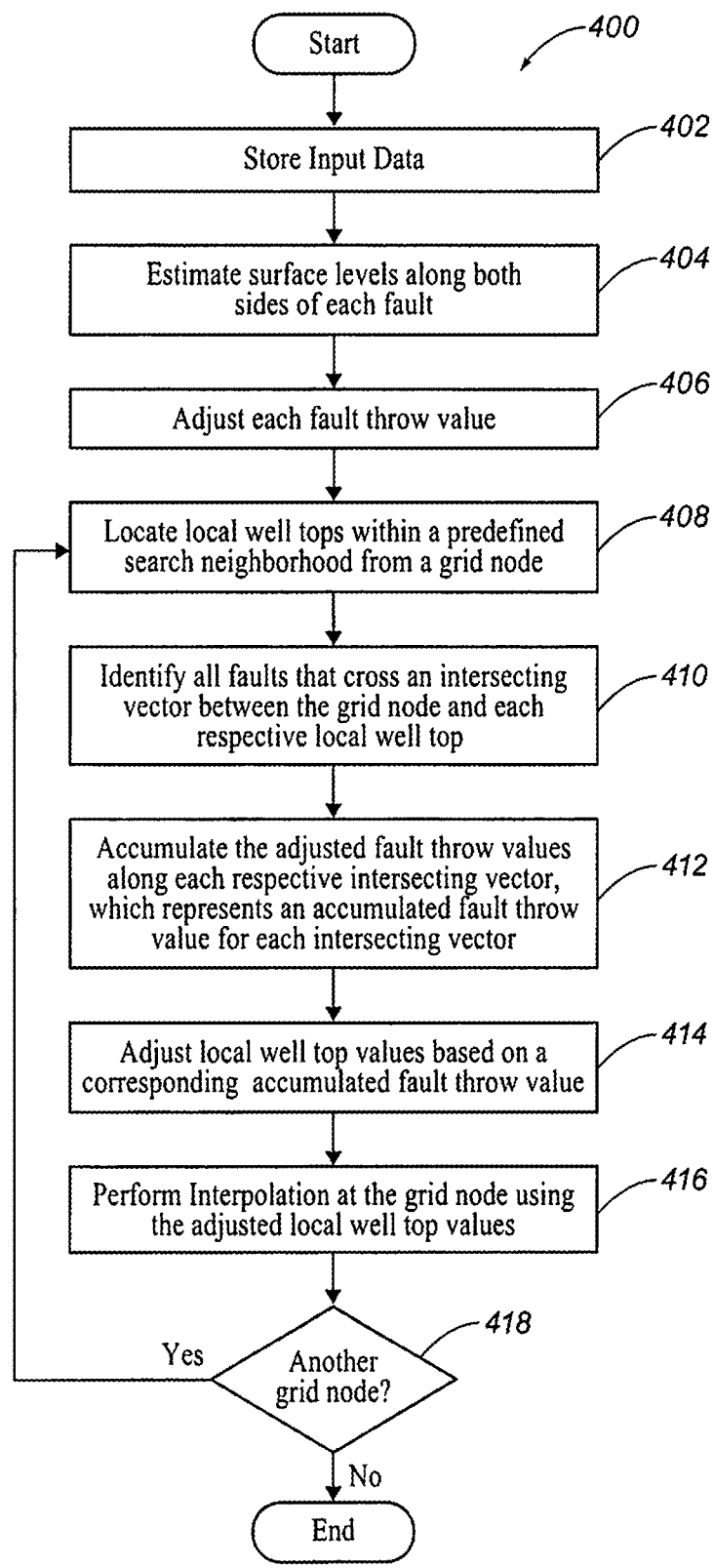
FIG. 4 is a flow diagram illustrating one embodiment of a method for implementing the present invention.

Referring now to FIG. 4, a flow diagram illustrates one embodiment of a method 400 for implementing the present invention. The method 400 creates a surface in a faulted space using interpolation techniques. The method 400 in this example uses only well tops across faults to create the interpolated surface. The method 400 not only generates sharp edges around the faults, but also interpolates smoothly away from them.

Figure 7:
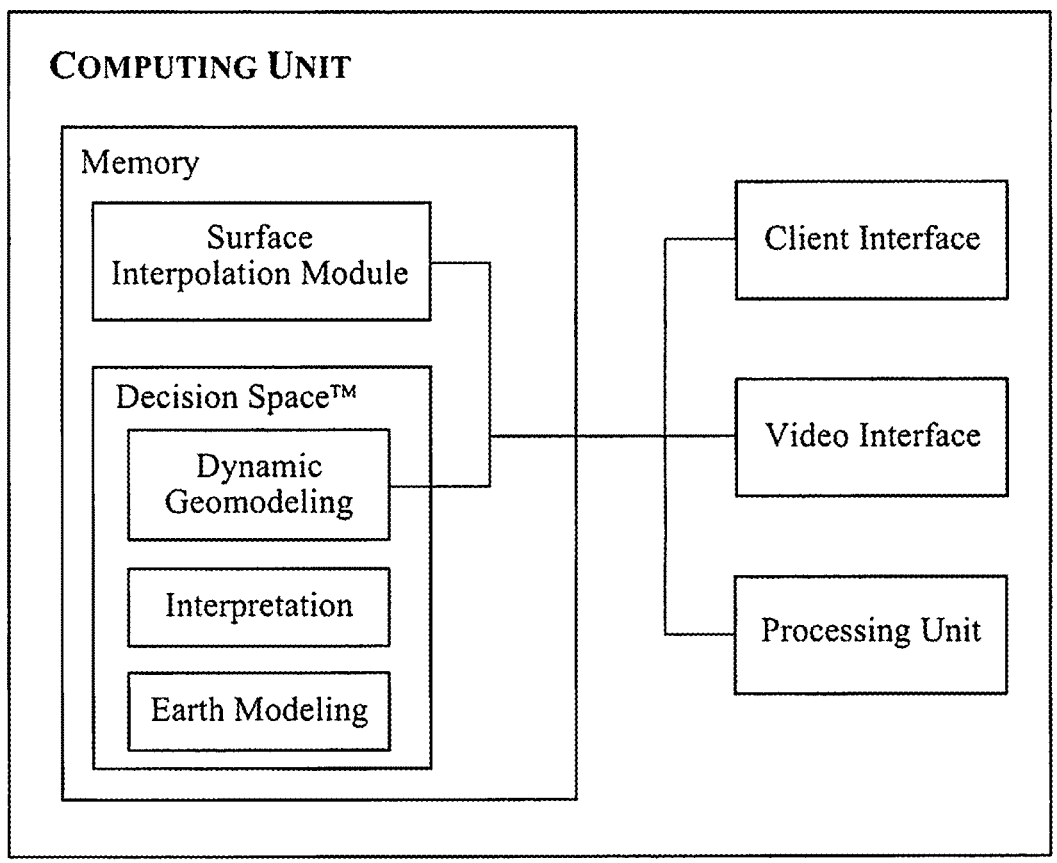
FIG. 7 is a block diagram illustrating one embodiment of a computer system for implementing the present invention.

In step 402, input data are stored using the client interface and/or video interface described in reference to FIG. 7. The input data may comprise well tops and faults comprising numerous fault segments. Each well top is preferably stored in KD tree, which is a well known data structure for fast and efficient retrieval of the input data. Each fault segment is preferably stored in a Quad tree, which is also a well known data structure used for fast and efficient retrieval.

Figure 5:
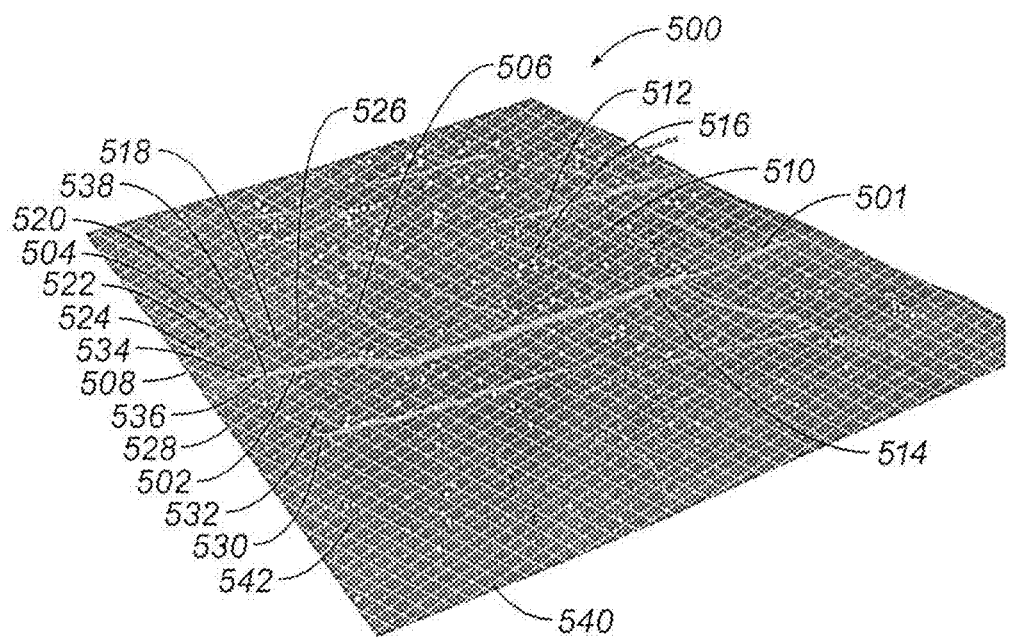
FIG. 5 illustrates a surface created by interpolation according to the present invention using real data.

In step 404, the surface level along both sides of each fault is estimated. The estimate is preferably done by finding each well top, which is stored as input data in step 402, in each fault block and interpolating the surface level along both sides of each fault using one or more, but not necessarily all, of the well tops found in each respective fault block. Interpolation is meant to encompass any well known interpolation technique such as, for example, kriging, collocated cokriging, simulation and collocated cosimulation algorithms. Each fault throw, which is defined as the amount of vertical displacement (i.e. elevation change) between the estimated surface levels, is stored as a value in the Quad tree data structure described in reference to step 402 with the estimated surface levels. As illustrated in FIG. 5, which represents an interpolated surface 500 using real input data in step 402, one fault block is defined by fault segments 502, 504, 506 and an edge 508 of the interpolated surface 500. Another fault block is defined by fault segments 510, 512, 514 and 516. The real data used for the interpolated surface 500 includes 9,995 fault segments and 329 well tops, which are illustrated within a 500by 500 grid 540. A fault 501 includes fault segment 502 at one end of the fault 501 and another fault segment 514 toward another end of the fault 501. Each fault block may contain one or more well tops as demonstrated by the fault block containing well tops 518-526. The fault block defined by an edge 528 of the interpolated surface 500 and fault segments 530, 532 and 534 may also contain one or more well tops. The surface level 538 along one side of the fault 501 therefore, was estimated by i) finding each well top in the fault block defined by fault segments 502, 504, 506 and the edge 508 of the interpolated surface 500; and ii) kriging that surface level using one or more of the well tops in the fault block. The surface level 536 along another side of the fault 501 therefore, was estimated by i) find each well top in the fault block defined by fault segments 530, 532, 534 and the edge 528 of the interpolated surface 500; and ii) kriging that surface level using one or more of the well tops in the fault block. The surface level on each side of the fault 501 may be estimated in this manner (fault block by fault block) from one end of the fault 501 to another end of the fault 501. Alternatively, this step may begin anywhere between each end of the fault 501 and proceed in any manner or sequence until the entire surface level on each side of the fault 501 is estimated.

In step 406, each fault throw value is adjusted by i) smoothing the surface levels estimated in step 404 along each side of each fault that belong to the same fault block; and ii) tapering each fault throw value to zero at each distal end of each fault. The tapering should not effect a fault intersecting another fault and thus, necessarily occurs between each distal end of a fault and the closest point at which another fault intersects the fault.

In step 408, the local well tops within a predefined search neighborhood from a grid node are located using the well tops stored as input data in step 402, regardless of whether the local well tops cross fault segments and/or fault blocks. Each local well top has a local well top value that represents the surface level of that local well top. As illustrated by the grid 540 in FIG. 5, the local well tops within a predefined search neighborhood from grid node 542 may or may not include well tops 518-526 depending on the size of the predefined search neighborhood. The predefined search neighborhood may include any geometric shape, however, is preferably predefined by a radius from the grid node forming a circular search neighborhood.

In step 410, all faults that cross a vector between the grid node and each respective local well top located in step 408 are identified using the faults stored in step 402. Each vector between the grid node and each respective local well top located in step 408 represents an intersecting vector.

In step 412, the adjusted fault throw values in step 406 are accumulated (added together) along each respective intersecting vector and the result represents an accumulated fault throw value for each respective intersecting vector. Because each intersecting vector corresponds with (intersects) a separate local well top and the accumulated fault throw value represents the adjusted fault throw values along each intersecting vector, each accumulated fault throw value may be different for each respective local well top.

In step 414, the value of each local well top found in step 408 is adjusted based on the accumulated fault throw value that corresponds with each intersecting vector for a respective local well top. Each adjusted local well top value therefore, is equal to the value of the respective local well top plus the accumulated fault throw value for the intersecting vector that intersects that respective local well top. As a result, the adjusted local well top values temporarily remove the local fault throw.

In step 416, interpolation is performed at the grid node using the adjusted local well top values from step 414. Interpolation is meant to encompass any well known interpolation technique such as, for example, kriging, collocated cokriging, simulation and collocated cosimulation algorithms. Optionally, other well known interpolation techniques may be used. In this manner, the new adjusted local well tops are interpolated onto the grid.

In step 418, the method 400 determines whether there is another grid node within the grid. If there is not another grid node within the grid, then the method 400 ends. If there is another grid node within the grid, then the method 400 returns to step 408 and repeat steps 408, 410, 412, 414 and 416 for each grid node within the grid.

Figure 1:
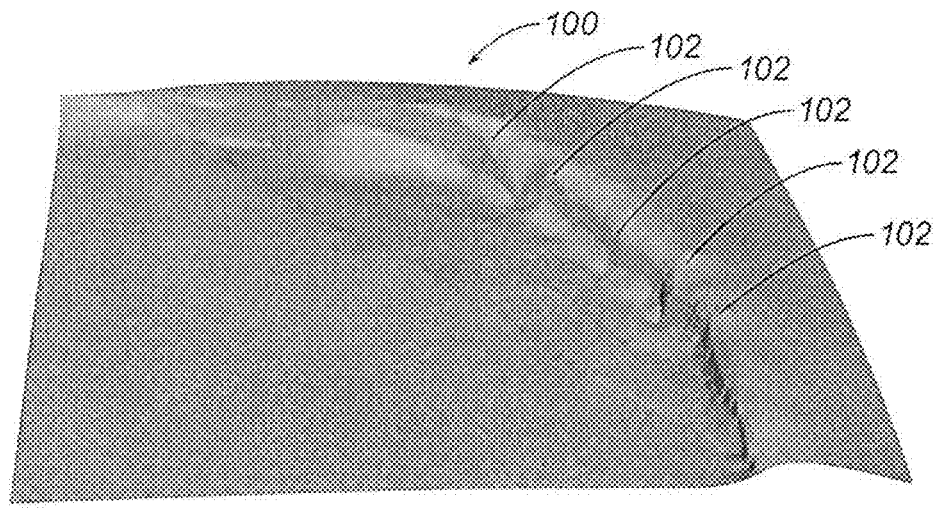
FIG. 1 illustrates a surface and artifacts produced by conventional refinement gridding interpolation using real data.
Figure 2:
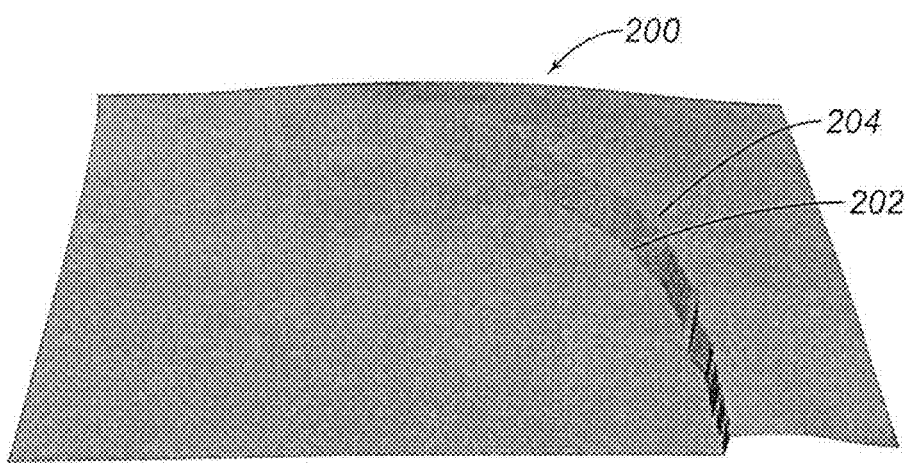
FIG. 2 illustrates a surface produced by traditional kriging interpolation and the same data used to produce the interpolated surface in FIG. 1.
Figure 3:
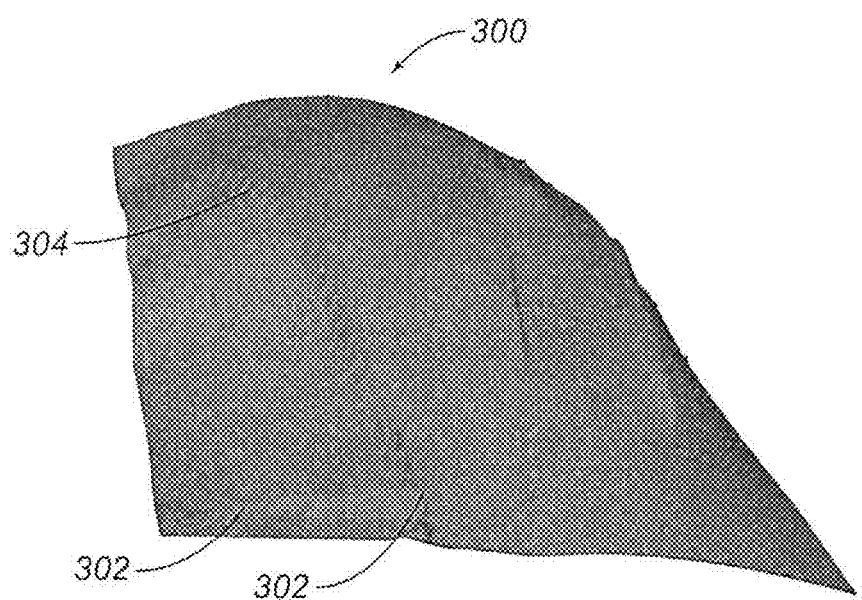
FIG. 3 illustrates a surface and artifacts produced by traditional kriging interpolation and artificial data.
Figure 6:
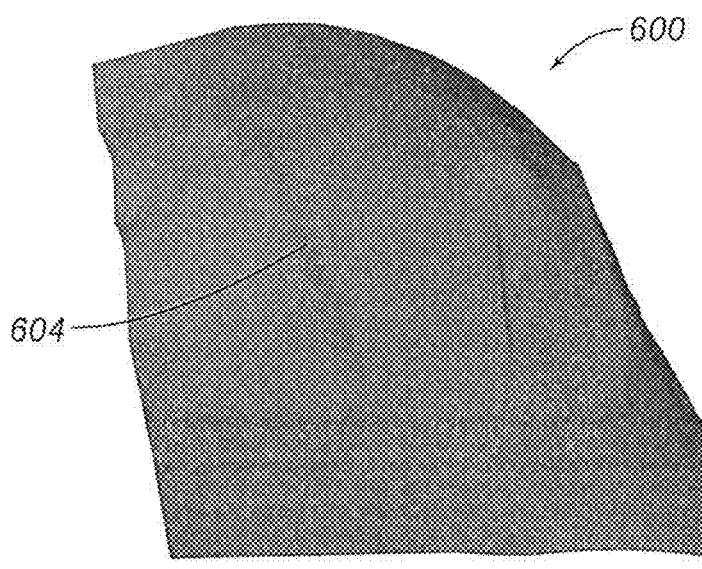
FIG. 6 illustrates a surface created by interpolation according to the present invention using the same data used to produce the interpolated surface in FIG. 3.

Although the fault network lying within the interpolated surface 500 in FIG. 5 is complicated, the method 400 produced an interpolated surface 500 with fewer artifacts around the end of each fault when compared to other conventional methods. As illustrated by the comparison of FIG. 3 and FIG. 6, which illustrates a surface interpolated according to method 400 using the same data used to produce the interpolated surface in FIG. 3, the method 400 provides a significant improvement in reducing undesirable artifacts. For example, the artifacts 302 located near the termination of the fault 304 in the interpolated surface 300 are not present near the termination of the fault 604 in the interpolated surface 600 of FIG. 6. This approach therefore, represents a substantial improvement for interpolating surfaces having one or more faults.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace™, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 7, a block diagram of a system for implementing the present invention on a computer is illustrated. The system includes a computing unit, sometimes referred to a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 4-6. The memory therefore, primarily includes a surface interpolation module, which performs steps 402-418 illustrated in FIG. 4. Although DecisionSpace™ may be used to interface with the surface interpolation module to perform steps 402-418, other interface applications may be used instead of DecisionSpace™ or the surface interpolation module may be used as a stand alone application. DecisionSpace™ provides a common interface for the surface interpolation module and other applications and/or modules illustrated in FIG. 7. It allows the user to access data, view it in 1D, 2D and 3D viewers and perform various types of data interpretation and computations. The surface interpolation module is currently configured to be implemented through the Dynamic Geomodeling™ module in DecisionSpace™ as illustrated in FIG. 7.

Although the computing unit is shown as having a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/non-volatile computer storage media or they may be implemented in the computing unit through application program interface ("API"), which may reside on a separate computing unit connected through a computer system or network. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

The invention claimed is:

1. A method for reducing a number of artifacts along one or more faults in a surface related to a simulation of a subsurface formation, the method comprising:
    a) locating, by a computer processor, each local well top within a predefined search neighborhood from a grid node within a grid on the surface;
    b) identifying, by the computer processor, each fault that crosses a vector between the grid node and each respective local well top, each vector between the grid node and each respective local well top representing an intersecting vector;
    c) accumulating, by the computer processor, an adjusted fault throw value for each fault along each respective intersecting vector, wherein the adjusted fault throw value represents an accumulated fault throw value for each respective intersecting vector;
    d) adjusting, by the computer processor, a value for each local well top based on a respective accumulated fault throw value;
    e) performing, by the computer processor, interpolation at the grid node using the adjusted value for each local well top to create at least a portion of the surface;
    f) creating, by the computer processor, the surface by repeating steps a)-e) for each grid node within the grid; and
    g) causing, by the computer processor, the surface to be displayed using a display device to enable hydrocarbons to be located in the subsurface formation.

2. The method of claim 1, further comprising storing input data comprising well tops and faults, each fault comprising one or more fault segments, each well top being stored in a KD tree data structure and each fault segment being stored in a Quad tree data structure.

3. The method of claim 1, wherein each fault throw value is adjusted—by smoothing estimated surface levels along each side of each fault that belong to the same fault block and tapering each fault throw value to zero at each distal end of each fault.

4. The method of claim 3, wherein the surface level on each side of each fault is estimated by finding each well top in each fault block and interpolating the surface level along each side of each fault using one or more of the well tops found in each respective fault block.

5. The method of claim 4, wherein the interpolation is performed by kriging, collocated cokriging, simulation or collocated cosimulation.

6. The method of claim 1, wherein the predefined search neighborhood forms a circular search neighborhood with a radius from the grid node.

7. The method of claim 1, wherein each adjusted fault throw value is accumulated by adding each fault throw value along each respective intersecting vector.

8. The method of claim 1, wherein the value for each local well top is adjusted by adding the value of each local well top to the respective accumulated fault throw value.

9. The method of claim 8, wherein the respective accumulated fault throw value is the accumulated fault throw value for the intersecting vector that intersects the respective well top.

10. The method of claim 1, wherein performing interpolation at the grid node comprises kriging, collocated cokriging, simulation or collocated cosimulation at the grid node using the adjusted value for each local well top.

11. A non-transitory program carrier device tangibly carrying computer executable instructions for reducing a number of artifacts along one or more faults in a surface related to a simulation of a subsurface formation, the instructions being executable to implement:
    a) locating each local well top within a predefined search neighborhood from a grid node within a grid on the surface;
    b) identifying each fault that crosses a vector between the grid node and each respective local well top, each vector between the grid node and each respective local well top representing an intersecting vector;
    c) accumulating an adjusted fault throw value for each fault along each respective intersecting vector, wherein the adjusted fault throw value represents an accumulated fault throw value for each respective intersecting vector;
    d) adjusting a value for each local well top based on a respective accumulated fault throw value;
    e) performing interpolation at the grid node using the adjusted value for each local well top to create at least a portion of the surface;
    f) creating the surface by repeating steps a)-e) for each grid node within the grid; and
    g) causing the surface to be displayed using a display device to enable hydrocarbons to be located in the subsurface formation.

12. The program carrier device of claim 11, further comprising storing input data comprising well tops and faults, each fault comprising one or more fault segments, each well top being stored in a KD tree data structure and each fault segment being stored in a Quad tree data structure.

13. The program carrier device of claim 11, wherein each fault throw value is adjusted by smoothing estimated surface levels along each side of each fault that belong to the same fault block and tapering each fault throw value to zero at each distal end of each fault.

14. The program carrier device of claim 13, wherein the surface level on each side of each fault is estimated by finding each well top in each fault block and interpolating the surface level along each side of each fault using one or more of the well tops found in each respective fault block.

15. The program carrier device of claim 14, wherein the interpolation is performed by kriging, collocated cokriging, simulation or collocated cosimulation.

16. The program carrier device of claim 11, wherein the predefined search neighborhood forms a circular search neighborhood with a radius from the grid node.

17. The program carrier device of claim 11, wherein each adjusted fault throw value is accumulated by adding each fault throw value along each respective intersecting vector.

18. The program carrier device of claim 11, wherein the value for each local well top is adjusted by adding the value of each local well top to the respective accumulated fault throw value.

19. The program carrier device of claim 18, wherein the respective accumulated fault throw value is the accumulated fault throw value for the intersecting vector that intersects the respective well top.

20. The program carrier device of claim 11, wherein performing interpolation at the grid node comprises kriging, collocated cokriging, simulation or collocated cosimulation at the grid node using the adjusted value for each local well top.

* * * * *